United States Patent [19]

Hikosaka et al.

[11] Patent Number: 5,721,358
[45] Date of Patent: Feb. 24, 1998

[54] PROCESS FOR THE PRODUCTION OF COPPER PHTHALOCYANINE

[75] Inventors: Michichika Hikosaka, Tokyo, Japan; Gerard Coispeau, Louviers, France

[73] Assignees: Toyo Ink Manufacturing Co., Ltd., Tokyo, Japan; Francolor Pigments, Rieux, France

[21] Appl. No.: 677,872

[22] Filed: Jul. 10, 1996

Related U.S. Application Data

[63] Continuation-in-part of Ser. No. 427,903, Apr. 26, 1995, abandoned.

[30] Foreign Application Priority Data

Apr. 28, 1994 [JP] Japan .................. 6-113927

[51] Int. Cl.$^6$ .................. C07D 487/22; C09B 47/06
[52] U.S. Cl. .................. 540/144; 540/142; 106/498
[58] Field of Search .................. 540/144, 142; 106/498

[56] References Cited

U.S. PATENT DOCUMENTS 5,138,047 8/1992 Bornengo et al. .................. 540/144

*Primary Examiner*—John M. Ford
*Assistant Examiner*—Pavanaram K. Sripada
*Attorney, Agent, or Firm*—Wenderoth, Lind & Ponack

[57] ABSTRACT

A process for the production of a highly pure copper phthalocyanine at high yields while improving the state of a reaction system, the improvement in which a dispersing agent of the formula (1) in the form of a polymer is added to the reaction system, $$A-(O-R^1-CO)_n-B \quad (1)$$

wherein A is hydrogen, a linear or branched alkyl group having 1 to 20 carbon atoms, a linear or branched alkenyl group having 1 to 20 carbon atoms or a polyisobutylene residue having a polymerization degree of 50 to 500, $R^1$ is a linear or branched aliphatic residue having up to 20 carbon atoms, n is a number in the range of $0 \leq n \leq 20$, and when n=0, B is a compound of the formula (2),

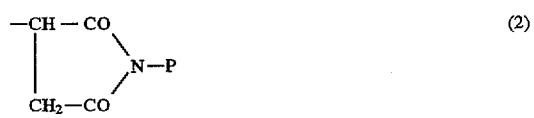

wherein P is $(CH_2CH_2NH)_kCH_2CH_2NH_2$ in which k is an integer of 0 to 20 or an alkyleneamine group having 3 to 20 carbon atoms, or when n≠0, B is a compound of the formula (3), $$-X-(C_m-H_{2m})-Q \quad (3)$$

wherein X is —NH— or —O—, m is a number of 0 to 6 and Q is —NR$^2$R$^3$ or —N$^+$R$^2$R$^3$R$^4$—Y$^-$ in which each of R$^2$ and R$^3$ is independently hydrogen or a linear or branched alkyl group having 1 to 6 carbon atoms or R$^2$ and R$^3$ together form a 5- or 6-membered ring containing N, R$^4$ is methyl or ethyl and Y is a monovalent anion.

7 Claims, No Drawings

PROCESS FOR THE PRODUCTION OF COPPER PHTHALOCYANINE

This application is a continuation-in-part of abandoned application Ser. No. 08/427,903.

FIELD OF THE INVENTION

The present invention relates to a process for the production of a highly pure copper phthalocyanine and/or a highly pure derivative thereof useful in the fields of pigments and dyes, at high yields.

PRIOR ART OF THE INVENTION

For the production of copper phthalocyanines, conventionally, there is industrially most widely employed a method in which a phthalic anhydride and/or its derivative, a copper compound and urea are heated in an inert solvent in the presence of a catalyst, and this method is known as a urea method or Wyler method.

The above urea method is industrially widely used at present. In the course of the reaction, however, none of the mixture of raw materials, a reaction intermediate and a product is brought into a completely dissolved state. That is, the reaction proceeds in a heterogeneous state from beginning to end. Further, at the step at which the reaction intermediate is formed, the viscosity of the reaction system increases to cause an insufficient mixing, nonuniformity in heat transfer and adhesion of the reaction mixture to a reactor wall. As a result, not only the operation for the reaction is hindered, but also the purity and yield of the product are decreased.

For overcoming the above defects, there have been proposed some methods in which, for example, a solvent having a high dissolving power is used to improve the stirring of the reaction system, or a solvent is used in an amount as small as about 2 times the amount of phthalic acid to have a good effect on the reaction yield. However, the problem of the former method is that it is not sufficient to produce a good effect, and that there is some limitation in the selection of a solvent which can be easily handled. In the latter method, the reaction system shows an increase in viscosity since the amount of the solvent is small, and there is therefore a defect in that it is required to increase the stirring power and the strength of the stirring apparatus.

JP-A-5-5866 discloses that the viscosity can be decreased by adding an anionic surfactant to the reaction system and that the amount of the solvent therefore can be decreased. This method can undoubtedly have a great effect on the improvement of the reaction system. However, it is well known that an anionic surfactant contained in a pigment decreases the interfacial tension between an offset printing ink and water to cause some problems such as the scumming of a printing plate, etc. It is very difficult to completely remove the anionic surfactant added to the reaction system in the subsequent steps of purification and pigment formation. Although the above method is clearly advantageous in view of the reaction step, it cannot solve all the problems when the suitability for the production of a pigment is taken into consideration.

It has been and is therefore strongly desired to develop a process for producing a highly pure copper phthalocyanine at high yields by improving the state of the reaction system without decreasing the interfacial tension of the pigment or impairing the economic performance of the process.

The present inventors have made diligent studies to overcome the above problems and to accomplish the above requirements, and have found the following. When a dispersing agent of some type is added in the production of phthalocyanine by a urea method, the viscosity of the reaction system decreases, the uniformity of the reaction system increases, and the reaction proceeds smoothly to produce a copper phthalocyanine at high yields. Further, the above dispersing agent is free from decreasing the interfacial tension of the copper phthalocyanine pigment.

SUMMARY OF THE INVENTION

It is an object of the present invention to provide a process for the production of a highly pure copper phthalocyanine at high yields while improving the state of a reaction system, without decreasing the interfacial tension of a pigment to be obtained.

It is another object of the present invention to provide a process for the production of a highly pure copper phthalocyanine at high yields by decreasing the viscosity of the reaction system, improving the uniformity of the reaction system and proceeding with the reaction smoothly.

According to the present invention, there is provided a process for the production of a copper phthalocyanine by heating phthalic acid and/or its derivative, a nitrogen source, a copper source and a catalyst in an inert solvent, the improvement in which a dispersing agent in the form of a polymer of the formula (1) is added to the reaction system,

wherein A is hydrogen, a linear or branched alkyl group having 1 to 20 carbon atoms, a linear or branched alkenyl group having 1 to 20 carbon atoms or a polyisobutylene residue having a polymerization degree of 50 to 500, $R^1$ is a linear or branched aliphatic residue having up to 20 carbon atoms, n is a number in the range of $0 \leq n \leq 20$, and when n=0, B is a compound of the formula (2),

wherein P is $(CH_2CH_2NH)_k CH_2CH_2NH_2$ in which k is an integer of 0 to 20 or an alkyleneamine group having 3 to 20 carbon atoms, or when $n \neq 0$, B is a compound of the formula (3),

wherein X is —NH— or —O—, m is a number of 0 to 6 and Q is $-NR^2R^3$ or $-N^+R^2R^3R^4 -Y^-$ in which each of $R^2$ and $R^3$ is independently hydrogen or a linear or branched alkyl group having 1 to 6 carbon atoms or $R^2$ and $R^3$ together form a 5- or 6-membered ring containing N, $R^4$ is methyl or ethyl and Y is a monovalent anion.

DETAILED DESCRIPTION OF THE INVENTION

The phthalic acid and/or its derivative used in the present invention include(s) phthalic acid, alkali metal salt, ammonium salt and organic amine salt of phthalic acid, phthalic anhydride, phthalimide, phthaldiamide, phthalodinitrile, 1,3-diaminoisoindoline and compounds which are the same as these described here except that the benzene ring is substituted with 1 to 4 halogen atoms. These compounds may be used alone or in combination.

The nitrogen source such as urea is generally used in an amount of at least 3 mol per mole of the phthalic acid and/or its derivative. Substituted urea such as biuret may be used. Further, when a phthalic acid containing no nitrogen such as phthalic acid or phthalic anhydride is used as a raw material, part of urea may be replaced with ammonia or an ammonium compound in the first imidation reaction.

The copper source used in the present invention is generally copper chloride, while it may be selected from copper salts such as a metal copper powder, copper oxide, copper sulfate and copper acetate and complexes of copper salts such as copper chloride and any one of ammonia, urea and an amine.

The catalyst used in the present invention is generally ammonium molybdate, while it may be selected from molybdenum (VI) oxide and molybdic acid. The catalyst is used in an amount, as a molybdenum content, of 0.001 to 0.02 part by weight based on the phthalic acid.

The inert solvent used in the present invention can be selected from those solvents which are conventionally used for the production of copper phthalocyanine. The inert solvent includes nitrobenzene, trichlorobenzene, chloronaphthalene, alkylbenzenes, alkylnaphthalenes and kerosenes. The amount of the inert solvent is 1 to 5 times, preferably 1.5 to 2.5 times, as large as the amount of the phthalic acid. When the amount of the inert solvent is larger than the above upper limit, the stirring can be carried out easily, while the yield of a copper phthalocyanine tends to decrease. When this amount is less than the above lower limit, the viscosity of the reaction system is too high to stir it.

The dispersing agent in the form of a polymer, which characterizes the present invention, is a compound of the formula (1);

wherein A is hydrogen, a linear or branched alkyl group having 1 to 20 carbon atoms, a linear or branched alkenyl group having 1 to 20 carbon atoms or a polyisobutylene residue having a polymerization degree of 50 to 500, $R^1$ is a linear or branched aliphatic residue having 20 carbon atoms or less, n is an integer of 0 to 20, and B is a compound of the formula (2) when n=0,

wherein P is $(CH_2CH_2NH)_kCH_2CH_2NH_2$ in which k is an integer of 0 to 20 or an alkyleneamine group having 3 to 20 carbon atoms, or a compound of the formula (3) when n≠0,

wherein X is —NH— or —O—, m is a number of 0 to 6, and Q is —$NR^2R^3$ or —$N^+R^2R^3R^4$—$Y^-$ in which each of $R^2$ and $R^3$ is independently hydrogen or a linear or branched alkyl group having 1 to 6 carbon atoms or $R^2$ and $R^3$ together form a 5- or 6-membered ring containing N, $R^4$ is methyl or ethyl, and Y is a monovalent anion.

In the above dispersing agent in the form of a polymer, represented by the formula (1) in which B is a compound of the formula (2), particularly preferred is a compound of the formula (1) in which A is a polyisobutylene residue having a polymerization degree of 50 to 500. This preferred dispersing agent can be synthesized by reacting a polyisobutylene having a polymerization degree of 50 to 500 with maleic anhydride in an addition reaction and then imidating the resultant adduct with a polyamine such as ethylenediamine, diethylenetriamine or triethylenetetramine.

The dispersing agent in the form of a polymer preferably includes:

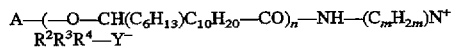

wherein A is as defined in the formula (1), n is a number in the range of $0<n \leq 20$, and m, $R^2$, $R^3$, $R^4$ and $Y^-$ are as defined in the formula (3), and

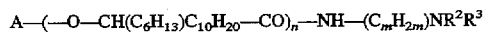

wherein A is as defined in the formula (1), n is a number in the range of $0<n \leq 20$, and m, $R^2$ and $R^3$ are as defined in the formula (3).

The above dispersing agent of the formula

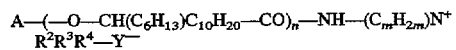

can be synthesized by polycondensing hydroxystearic acid to form a polymer having terminal hydroxyl group and reacting the polymer with an amine $NH_2(C_mH_{2m})N^+R^2R^3R^4Y^-$ (in which m, $R^2$, $R^3$, $R^4$ and $Y^-$ are as defined in the formula (3)).

The above dispersing agent of the formula

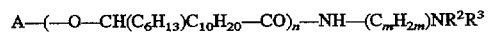

can be synthesized by polycondensing hydroxystearic acid to form a polymer having terminal hydroxyl group and reacting the polymer with an amine $NH_2(C_mH_{2m})N^+R^2R^3R^4Y^-$ (in which m, $R^2$, $R^3$, $R^4$ and $Y^-$ are as defined in the formula (3)).

The amount of the dispersing agent based on the reaction product is preferably approximately 0.001 to 0.15% by weight.

The copper phthalocyanine of the present invention can be produced under conventional production conditions and conventional post-treatment conditions. For example, the temperature is set at 60° to 220° C., the time is set for 2 to 8 hours, and the pressure is set at atmospheric pressure to about 5 kg/cm².

EXAMPLES

The present invention will be detailed hereinafter with reference to Examples, in which "part" stands for "part by weight", and "%" stands for "% by weight", unless otherwise specified.

Example 1

59.2 Parts of phthalic anhydride, 90 parts of urea, 9.9 parts of cuprous chloride, 0.178 part of ammonium molybdate, 112 parts of Hisol P (alkylbenzene solvent, supplied by Nippon Petrochemical Co., Ltd.) and 3.55 parts of the following dispersing agent were allowed to react under atmospheric pressure at 190° to 200° C. for 4 hours. During the reaction, the reaction system was in a well mixed state, and the reaction proceeded smoothly.

Dispersing agent

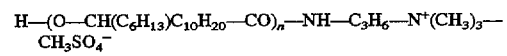

wherein n was 7 on average.

After the reaction, the solvent was removed by evaporation under reduced pressure, and the remaining reaction product was purified with hot water, with a dilute acid and with hot water, and dried to give 58.5 parts of a crude copper phthalocyanine (Crude-1, purity 98.1%, yield 94.5%). Crude-1 was formed into a pigment by a conventional method to give a b-form copper phthalocyanine (Pigment-1).

5.0 Grams of Pigment-1 was wetted with 5 milliliters of methanol and then dispersed in 200 ml of pure water and the mixture was stirred at 80° C. for 60 minutes. The mixture was cooled to room temperature, pure water was added until the total amount of the mixture became 300 g, and the mixture was filtered. The resultant filtrate was measured for a surface tension to show 68.0 mN/m. This value was about the same as the value of surface tension in Comparative Example 2 to be described later. This value shows that the use of the above dispersing agent during the synthesis of a copper phthalocyanine does not cause a decrease in the surface tension and has no adverse effect on the emulsifiability of an offset ink in the preparation of an offset ink.

Example 2

59.2 Parts of phthalic anhydride, 78 parts of urea, 9.7 parts of cuprous chloride, 0.592 part of ammonium molybdate, 118 parts of kerosene and 1.78 parts of the following dispersing agent were allowed to react, and the post treatment was carried out, in the same manner as in Example 1 to give 56.8 parts of a crude copper phthalocyanine (Crude-2, purity 97.0%, yield 93.0%). The reaction system was in a well mixed state as well as in Example 1.

Dispersing agent $$CH_3(CH_2)_{10}CO-(O-CH(C_6H_{13})C_{10}H_{20}-CO)_n-NH-C_2H_4-N(C_4H_9)_2$$

wherein n was 7 on average.

Crude-2 was formed into a pigment in the same manner as in Example 1 to give a b-form copper phthalocyanine (Pigment-2). Pigment 2 was extracted with water in the same manner as in example 1, and the filtrate showed a surface tension of 68.7 mN/m. This value shows that the use of the above dispersing agent does not have an adverse effect on the emulsifiability.

Example 3

58.8 Parts of phthalimide, 60 parts of urea, 10.1 parts of cuprous chloride, 0.355 parts of ammonium molybdate, 130 parts of kerosene and 2.94 parts of a dispersing agent of the following formula (1) were allowed to react, and the post treatment was carried out, in the same manner as in Example 1 to give 57.5 parts of a crude copper phthalocyanine (Crude-3, purity 97.6%, yield 94.0%). The reaction system was in a well mixed state as well as in Example 1.

Dispersing agent (trade name: Lubrizol LZ2153, supplied by Lubrizol, Ltd.)

$$A-(O-R^1-CO)_n-B \quad (1)$$

wherein A was a polyisobutylene residue having a polymerization degree of 50 to 500, n was 0, and B was a compound of the formula (2),

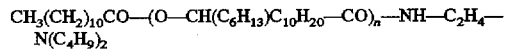  (2)

wherein P was $(CH_2CH_2NH)_kCH_2CH_2NH_2$ in which k was an integer of 0 to 20 or an alkyleneamine group having 3 to 20 carbon atoms.

Crude-3 was formed into a pigment in the same manner as in Example 1 to give a b-form copper phthalocyanine (Pigment-3). Pigment 3 was extracted with water in the same manner as in example 1, and the filtrate showed a surface tension of 68.7 mN/m. This value shows that the use of the above dispersing agent does not have an adverse effect on the emulsifiability.

Example 4

50.1 Parts of phthalic anhydride, 14.3 parts of sodium monochlorophthalate, 84 parts of urea, 9.9 parts of cuprous chloride, 0.258 parts of ammonium molybdate, 176 parts of Hisol P and 2.58 parts of the following dispersing agent were allowed to react, and the post-treatment was carried out, in the same manner as in Example 1 to give 57.0 parts of a crude, low-chlorinated copper phthalocyanine (Crude-4, purity 98.1%, yield 91.1%). The reaction system was in a well mixed state as well as in Example 1.

Dispersing agent $$H-(CO-CH(C_6H_{13})C_{10}H_{20}-CO)_n-B$$

wherein B was a compound of the formula (4) and n was 7 on average.

$$-NH-C_3H_6-N-C_4H_8-CH_2 \quad (4)$$

Crude-4 was formed into a pigment by a conventional acid-paste method to give an a-form, low-chlorinated copper phthalocyanine (Pigment-4). Pigment-4 was clear and excellent in dispersibility, and an ink containing Pigment-4 was also excellent in resistance to dampening solution.

Comparative Example 1

59.2 Parts of phthalic anhydride, 90 parts of urea, 9.9 parts of cuprous chloride, 0.178 parts of ammonium molybdate, 112 parts of Hisol P and 3.55 parts of sodium dodecylbenzenesulfonate were allowed to react, and the post-treatment was carried out, in the same manner as in Example 1 to give 56.8 parts of a crude copper phthalocyanine (Crude-5, purity 97.0%, yield 93.0%). The reaction system was in a well mixed state as well as in Example 1.

Crude-5 was formed into a pigment in the same manner as in Example 1 a b-form copper phthalocyanine (Pigment-5). Pigment 5 was extracted with water in the same manner as in example 1, and the filtrate showed a surface tension of 37.5 mN/m. This value shows that the use of the above dispersing agent decreases the surface tension of the pigment and impairs the emulsifiability of an offset ink.

Pigment-5 was washed with a 1% sodium hydroxide aqueous solution repeatedly and extracted with water, and the filtrate was measured for a surface tension to show 45.3 mN/m. This value was insufficient and shows that the additive was not completely removed.

Comparative Example 2

59.2 Parts of phthalic anhydride, 90 parts of urea, 9.9 parts of cuprous chloride, 0.178 part of ammonium molybdate and 112 parts of kerosene were allowed to react, and the post-treatment was carried out, in the same manner as in Example 1 to give 54.9 parts of a crude copper phthalocyanine (Crude-6, purity 97.1%, yield 92.6%). The reaction system was in a poor state where a gummy reaction intermediate and the solvent were separated from each other and the gummy reaction intermediate adhered to a reactor wall. Crude-6 was formed into a pigment in the same manner as in Example 1 to give a b-form copper phthalocyanine pigment (Pigment-6). Pigment-6 was extracted with water in the same manner as in Example 1, and the resultant filtrate was measured for a surface tension to show 69.2 mN/m. This value shows that when no surfactant is incorporated, a filtrate has a sufficiently high surface tension. That is, this value can be used as an index for excellence in emulsifiability.

According to the process of the present invention, the reaction system for the production of copper phthalocyanine, which is very heterogeneous in a conventional process, is improved even when a solvent having low dissolving power is used or when the amount of a solvent is decreased. Further, the viscosity increase can be prevented at the stage when a reaction intermediate is formed. As a result, the defective mixing, nonuniform heat transfer and the adhering of a reaction intermediate to a reactor wall can be overcome, and a copper phthalocyanine having a high purity can be produced at high yields.

Further, the process of the present invention takes into account the method of use of the produced copper phthalocyanine and the suitability for use of the produced copper phthalocyanine for the formation of a pigment, and when a pigment formed from the copper phthalocyanine is used in an ink, the decrease in the surface tension of the pigment is prevented, and the pigment can be used without causing adverse effects on other suitability of the ink.

What is claimed is:

1. In a process for the production of a copper phthalocyanine which comprises heating (a) a member selected from the group consisting of phthalic acid, a derivative of phthalic acid and mixtures thereof, (b) a nitrogen source, (c) a copper source, and (d) a catalyst in an inert solvent the improvement wherein a dispersing agent of the formula (1) in the form of a polymer is added to the reaction system,

A—(O—R$^1$—CO)$_n$—B     (1)

wherein A is hydrogen, a linear or branched alkyl group having 1 to 20 carbon atoms, a linear or branched alkenyl group having 1 to 20 carbon atoms or a polyisobutylene residue having a polymerization degree of 50 to 500, R$^1$ is a linear or branched aliphatic residue having up to 20 carbon atoms, n is a number in the range of $0 \leq n \leq 20$, and when n=0, B is a compound of the formula (2),

$$-CH-CO$$
$$\phantom{-CH}|\phantom{-CO}\diagdown$$
$$\phantom{-CH-CO}N-P \quad (2)$$
$$\phantom{-CH}|\phantom{-CO}\diagup$$
$$CH_2-CO$$

wherein P is (CH$_2$CH$_2$NH)$_k$CH$_2$CH$_2$NH$_2$ in which k is an integer of 0 to 20 or an alkyleneamine group having 3 to 20 carbon atoms, or when n≠0, B is a compound of the formula (3),

—X—(C$_m$—H$_{2m}$)—Q     (3)

wherein X is —NH— or —O—, m is a number of 0 to 6 and Q is —NR$^2$R$^3$ or —N$^+$R$^2$R$^3$R$^4$—Y$^-$ in which each of R$^2$ and R$^3$ is independently hydrogen or a linear or branched alkyl group having 1 to 6 carbon atoms or the alkyl groups R$^2$ and R$^3$ together with the N atom to which they are attached form a 5- or 6-membered ring, R$^4$ is methyl or ethyl and Y is a monovalent anion.

2. A process according to claim 1, wherein the dispersing agent in the form of a polymer is a compound of the following formula,

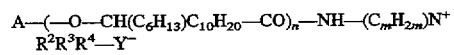

A—(—O—CH(C$_6$H$_{13}$)C$_{10}$H$_{20}$—CO)$_n$—NH—(C$_m$H$_{2m}$)N$^+$R$^2$R$^3$R$^4$—Y$^-$ wherein A is as defined in the formula (1), n is a number in the range of $0<n\leq 20$, and m, R$^2$, R$^3$, R$^4$ and Y$^-$ are as defined in the formula (3).

3. A process according to claim 1, wherein the dispersing agent in the form of a polymer is a compound of the following formula,

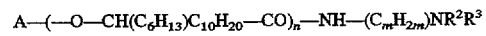

A—(—O—CH(C$_6$H$_{13}$)C$_{10}$H$_{20}$—CO)$_n$—NH—(C$_m$H$_{2m}$)NR$^2$R$^3$ wherein A is as defined in the formula (1), n is a number in the range of $0<n\leq 20$, and m, R$^2$ and R$^3$ are as defined in the formula (3).

4. A process according to claim 1, wherein the dispersing agent in the form of a polymer is a compound of the formula (1) wherein A is a polyisobutylene residue having a polymerization degree of 50 to 500, n is 0 and B is a compound of the formula (2).

5. A process according to claim 1, wherein the nitrogen source is added in an amount of at least 3 mol per mole of component (a).

6. A process according to claim 1, wherein the catalyst is added in an amount of 0.001 to 0.02 part by weight per part by weight of composition (a).

7. A process according to claim 1, wherein the inert solvent is added in an amount of 1 to 5 parts by weight per part by weight of the phthalic acid and/or its derivative.

* * * * *

UNITED STATES PATENT AND TRADEMARK OFFICE
CERTIFICATE OF CORRECTION

PATENT NO. : 5,721,358
DATED : February 24, 1998
INVENTOR(S) : MICHICHIKA HIKOSAKA and GERARD COISPEAU

It is certified that error appears in the above-identified patent and that said Letters Patent is hereby corrected as shown below:

Column 7, line 37 should read "(d) a catalyst in an inert solvent";

line 38 should read "the improvement wherein a dispersing agent of the formula (1) in the form of a polymer is added to the reaction system".

Signed and Sealed this

Second Day of March, 1999

Attest:

Q. TODD DICKINSON

*Attesting Officer*  Acting Commissioner of Patents and Trademarks